Jan. 10, 1956    M. E. JORDAN ET AL    2,730,453
PIGMENT PEPTIZING AGENT AND PROCESS
Filed June 29, 1951

INVENTOR.
Merrill E. Jordan and
Harvey M. Cole
by Pennie, Edmonds, Morton & Barrows
ATTYS

United States Patent Office 2,730,453
Patented Jan. 10, 1956

2,730,453

PIGMENT PEPTIZING AGENT AND PROCESS

Merrill E. Jordan and Harvey M. Cole, Walpole, Mass., assignors to Godfrey L. Cabot, Inc., Boston, Mass., a corporation of Massachusetts Application June 29, 1951, Serial No. 234,265

5 Claims. (Cl. 106—271)

This invention relates to peptizing agents and to processes for their production from asphalts.

Peptizing agents, which are substances promoting colloidal dispersion, are essential to the formation of many types of pigmented vehicle systems and can be used to advantage for dispersing pigments throughout many compounds in which satisfactory dispersion has been heretofore achieved only with considerable difficulty.

When a finely-divided pigment is added to a vehicle such as oil, wax, rubbery and resinous polymers and the like to produce a pigmented vehicle system the individual pigment particles will not disperse spontaneously throughout the vehicle but will tend to congregate together in large aggregates or in intermeshing long chains. This failure to disperse is due to the greater affinity of the particles for one another than for the vehicle. A pigment which behaves in such manner in a given vehicle is referred to as "lyophobic." The resulting mixture thus has what is commonly known as structure manifested by a gel-like consistency, or high viscosity, or false body or all of these characteristics.

In order to make a pigment lyophilic and to achieve a satisfactory and stable dispersion various expedients have been utilized. Certain pigments may be activated by oxidation at elevated temperatures. So treated they disperse fairly easily but are expensive to produce. Or the pigment may be worked into a vehicle by extensive milling but good dispersion is not always obtained and this is time consuming and expensive as well. Consequently, the preferred method of achieving an adequate dispersion is to use a dispersing, or peptizing, agent. However, since dispersants are usually also contaminants in most mixtures a tolerable balance must be maintained between dispersing effect and contamination.

The function of a peptizing agent is that of a protective colloid surrounding and separating the pigment particles from one another. Being of necessity compatible with the vehicle in which used, the agent thus forms a transition zone or layer between the individual or small groups of individual particles and the vehicle. The efficiency of any given peptizing agent is manifested, among other factors, by the flow properties of the vehicle system in which used, as will be discussed hereinafter.

We have discovered that an excellent peptizing agent can be produced from naturally occurring asphalts such as gilsonite by a series of critical solvent extraction steps. The product of our invention is a fraction of the parent asphaltic material and is remarkably and unexpectedly efficient in its peptizing action. Furthermore, because of its high efficiency it can be used in relatively small quantities and hence presents little contamination difficulty.

It is an object of our invention to provide a novel and valuable peptizing agent having an asphaltic base.

It is a further object of our invention to provide a practicable and satisfactory process for obtaining such peptizing agents from asphalts.

The peptizing agent of our invention may be obtained from any asphaltic raw material. Asphalts are defined by ASTM Designation D8–46 as follows: "Black to dark-brown solid or semisolid cementitious materials which gradually liquefy when heated, in which the predominating constituents are bitumens all of which occur in the solid or semisolid form in nature or are combinations of the bitumens mentioned with each other or with petroleum or derivatives thereof." Gilsonite is an example of such material.

Little is actually known about the chemical composition of asphalt. Its components are so numerous and their structures are so complex that they tend to undergo reformation when subjected to the rigors of analysis. However, rheological properties have unquestionably established that asphalt is a colloidal system in which the higher molecular weight constituents comprise the micellar, or dispersed, phase and the lower molecular weight materials comprise the intermicellar, or continuous, phase.

Although the micellar and intremicellar phases of asphalt are usually considered to be two distinct components of the parent asphalt, actually they are far from being distinct from one another in any given asphaltic material. Literally hundreds of intermediate or transition compounds are believed to exist in the parent material. For the reasons explained above, it is impossible to define the exact composition of these ingredients of asphalt by their boiling points, melting points, densities, etc. However, the fractions of these components are distinguishable from one another by the process by which they are extracted from the parent and it is the practice of those skilled in the art so to distinguish them.

Asphalts, particularly the naturally occurring types such as gilsonite, have enjoyed extensive usage in the ink and protective and decorative coating industries as binders, fillers, water repellants and the like. They have also been known to exhibit to a very minor extent the additional property of structure inhibition. However, it has been impossible to use the quantities of asphalt needed materially to reduce the structure formation tendencies of pigments in oil, wax, ink and other systems, since, in addition to their structure inhibiting properties, asphalts possess other properties which, if present in any appreciable degree, contaminate the system, make it excessively tacky, and in other ways make the mixture generally undesirable for normal use.

The agent of our invention, although a fraction of asphalt, is an excellent peptizer and is a non-contaminant when light colors are not required. It is produced from asphalt of the gilsonite type but has none of the deleterious characteristics in pigment mixtures of asphalt.

While we are able to locate the approximate position of the product of our invention among the components of such asphalt and to produce it with certainty and in commercial quantity, we are unable to ascertain its chemical structure for the reasons mentioned above. In appearance it is a brownish black solid, soluble in ether or benzene but insoluble in petroleum ether. It is compatible with paraffin or natural waxes at 85° C. and in such waxes or in solvents has a red-brown color. It has an apparent molecular weight by the cryoscopic method of around 432 and an atomic hydrogen/carbon ratio of about 1.5.

The novel product of our invention and the novel process for its production will best be understood and appreciated from the following description taken in connection with the accompanying drawings in which.

Figure 1:
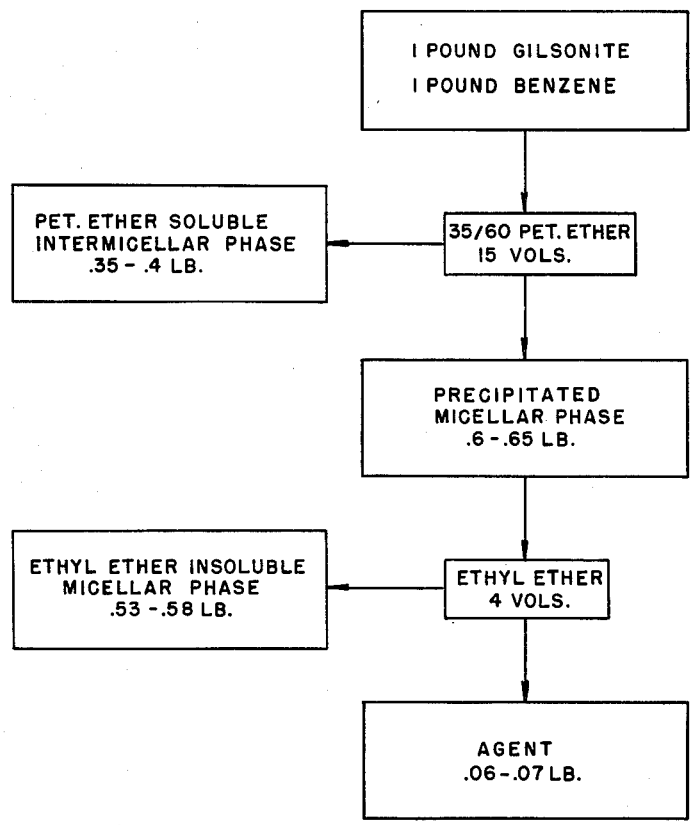
Fig. 1 is a flow sheet of the process steps employed.

In Fig. 1 gilsonite, as a representative asphalt, is shown as the starting material and the several stages of the process are graphically indicated. The first step consists in mixing the asphalt, preferably presoftened by addition of an equal weight of an aromatic solvent such as benzene, with a paraffinic hydrocarbon solvent having an internal pressure of about 3.2 and preferably selected from the group consisting of 35/60 petroleum ether and pentane and mixtures thereof. Internal pressure of the solvents referred to herein is equal to $BV^{-1/3}$, in which B is the surface tension and V is the molecular volume of the solvent. The amount of solvent used should be more than sufficient to dissolve all of the soluble portion of the asphalt. We have found that when the asphalt used is gilsonite about 15 volumes of solvent per volume of asphalt are sufficient for the purpose. The dissolved portion, consisting for the most part of the lower molecular weight intermicellar phase materials, is separated from the undissolved portion by usual techniques such as filtration or decanting and is discarded.

At this point about 60-65% of the gilsonite starting material remains. With this is mixed, in suitable ratio for complete dissolution of the soluble materials, a solvent having an internal pressure of above 3.2 but not above about 3.6 and being preferably selected from the group consisting of ethyl ether and hexane. Here the ratio of solvent to solubles will vary somewhat between solvents but in any event sufficient solvent to dissolve all materials soluble therein will be added. When using ethyl ether about four volumes of ethyl ether per volume of treated material is sufficient.

The dissolved material which is the product of our invention comprises about 6-7% of a starting material such as gilsonite is and can readily be separated from the insoluble materials by conventional techniques such as filtration or decanting. Thereafter, the product of our invention in relatively pure form is obtained by evaporation of the solvent.

It is, of course, old to fractionate materials by selective solvent extraction. Asphalt can be fractionated in various different ways but only by using the particular classes of solvents listed above is it possible, so far as we know, to produce the peptizing agent of our invention in commercially usable form. Furthermore, the product of our invention has never to our knowledge been heretofore produced.

It will readily be appreciated that the order in which the solvent extraction steps are carried out may be reversed although we prefer to follow the procedural order set forth above. Thus the fraction of asphalt containing the product of our invention can first be dissolved in the class of solvent referred to above and typified by ethyl ether and, after separation and evaporation of the solvent be mixed with the paraffinic hydrocarbon solvent also referred to above to dissolve out the lower molecular weight intermicellar phase material. The product is essentially identical from both procedures.

Figure 2:
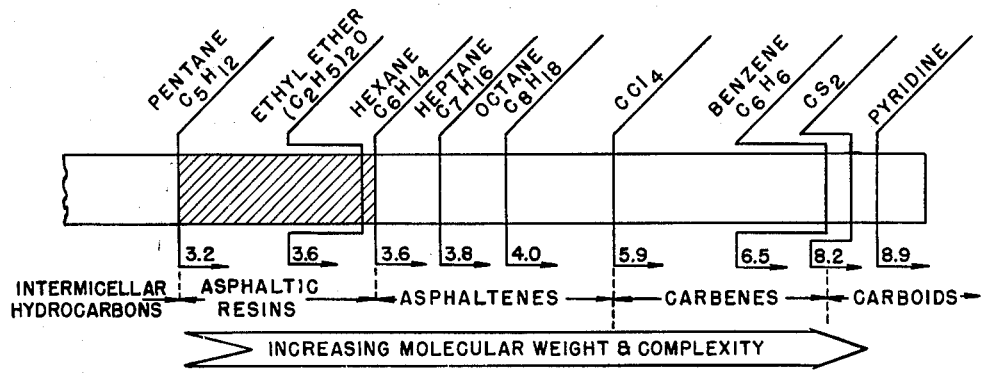
Fig. 2 is a graphical representation of the principal bodies of constituents of a typical asphalt.

In Fig. 2 we have represented the classes of components which are common to a typical asphalt and have shown the rough proportion in which they usually occur. The arrowed lines which delimit the scope of these classes represent the precipitating power of the various solvents as indicated. The internal pressure of each representative solvent is set forth above each arrow. Those components to the right of those lines are precipitated by the solvent; those to the left are dissolved by the solvent. The shaded section indicates the position of the peptizing agent of our invention.

The quickest and easiest method of determining the effectiveness of any peptizing agent is to incorporate the agent in a pigment-oil or pigment-wax-oil mixture and to test the mixture by several procedures. Certain of these are well known and all tests indicate the degree of pigment dispersion in the vehicle.

To test flow 400 grams of a mixture containing by weight:

|  | Percent |
|---|---|
| Pigment | 14 |
| Wax | 43 |
| Mineral oil | 43 | and, when added, peptizing agent in the amount of about 1% of the weight of the total mixture, the mixture is ball-milled for two hours at a temperature of 95° C. The mill is then dumped through a standard size opening, is rotated twice after initial draining stops and is then drained again until no further material flows out. The weight of the material recovered is termed the removal value.

To approximate the results of the ball mill flow test we also utilize a hot stage microscope test. A small portion of a mixture proportioned as for a ball mill test is heated to 90° C. and placed on the viewing slide of the microscope. The viewing platform is electrically heated to maintain the temperature of the mixture at 90°. It will be noted that the pigment in mixtures having a high removal value and good flow properties appeared at 200×magnification as tiny free flowing aggregates. Contrariwise the pigment in mixtures having low removal value will be distinctly lyophobic and they show distinct structural patterns and failing to move in the vehicle even when pressure is exerted on the cover plate of the slide.

To ascertain viscosity a Stormer viscosimeter may be utilized but for the standard paddle there should be substituted a solid cylindrical bob 3.1 cm. diameter and 3.5 cm. long. The bob is completely immersed in the mixture contained in an insulated and heated cup 3.9 cm. in diameter.

In the following example are set forth results of ball mill tests on carbon black—Ouricury wax—mineral oil mixtures, comparing mixtures with and without the peptizing agent of our invention. Carbon black A was pelletized ink grade black and black B was a mikropulverized fluffy ink grade black.

*Example*

| Run No. | Black | Agent, percent by wt. of total mixture | Removal Value, grams | Apparent Viscosity (Seconds) |
|---|---|---|---|---|
| 1 | A | none | 345 | 58.4 |
| 2 | A | do | 346 | 58.4 |
| 3 | A | 1% product of invention | 373 | 38.0 |
| 4 | A | do | 372 | 36.8 |
| 5 | A | 1% gilsonite | 356 | 70.0 |
| 6 | B | none | 307 | 40.5 |
| 7 | B | 1.25% product of invention | 382 | 35.0 |

We also examined mixtures in which the natural wax was entirely replaced with paraffin wax under the hot stage microscope. Mixtures containing the product of our invention appeared to have the carbon black well dispersed throughout their body and showed little evidence of structure. Normally carbon black will not satisfactorily disperse in paraffin wax.

It will be apparent from the above example that whereas 1% of gilsonite in run 5 increased the removal value over run 1 by 11 grams, 1% of the product of our invention increased the removal value some 27 grams. The increase in removal value expressed percentage-wise amounts to some 245% and there are no undesirable impurities.

If it could be assumed that the improvement in removal value is directly proportional to the quantity of peptizing material used, it may be noted that some 3% of gilsonite would be needed in order to achieve a yield value of 373 grams. Such a large amount of gilsonite would be harmful in most pigment-oil-wax mixtures as discussed above and it is doubtful that such a removal value could be achieved with gilsonite.

In the case wherein black B was incorporated an increase in removal value of some 75 grams was realized from an addition of a mere 1.25% of the product of our invention. Such a result was most unexpected and is indeed a highly satisfactory one.

Under the hot stage microscope the mixtures of runs Nos. 1, 2 and 6 evidenced pronounced chainlike network arrangement of particles. The particles of the pigment in the mixture appeared to be completely immobile. Even when force was applied by pressing a glass slide against the top surface of the mixture the particles of pigment remained motionless. The observations are characteristic of systems having high structure.

By contrast, the mixtures of runs Nos. 3, 4 and 7 appeared to be devoid of rigorous chainlike patterns. These mixtures contained small aggregates which appeared to be in a continuous state of motion within the mixture. These observations reveal an absence of structure.

The mixture of run No. 5 was similar in appearance to those of runs Nos. 3, 4 and 7 but the particles of pigment within the mixture remained motionless unless pressure was applied to the surface of the mixture through the glass cover slide.

The viscosity data of the example further bears out the high and potent effectiveness of the product of our invention. It will be noted that whereas the addition of 1% gilsonite substantially increased the viscosity of the resulting carbon paper ink, the addition of the product of our invention in a similar amount had the opposite effect. The addition of small amounts of the product of our invention to oil-wax-pigment systems substantially reduced the viscosity of the system in every case.

While we have referred specifically to carbon black as a pigment responding to a marked degree to treatment by association with the asphaltic peptizing agent of our invention, other organic pigments may also be treated with advantage.

Having thus disclosed our invention, we claim as new and desire to secure by Letters Patent:

1. A composition of matter characterized by its high peptizing effect upon pigments in wax containing vehicles comprising an asphaltic fraction insoluble in solvents having an internal pressure of about 3.2 and less and soluble in solvents having an internal pressure of about 3.6, internal pressure being equal to $BV^{-1/3}$ in which B is the surface tension and V is the molecular volume of the solvent, said compositon being substantially free of other asphaltic fractions.

2. A composition of matter characterized by its high peptizing effect upon pigments in admixture with a material selected from the group consisting of natural wax, paraffin wax and mineral oil comprising an asphaltic fraction insoluble in solvents selected from the group consisting of 35/60 petroleum ether and pentane and soluble in solvents selected from the group consisting of hexane and ethyl ether said composition being substantially free of other asphaltic fractions.

3. A process for producing an agent of high peptizing potency which comprises the steps of dissolving the soluble portion of an asphalt in a solvent having an internal pressure of about 3.2, recovering the insoluble portion therefrom, dissolving the soluble portion of said first insoluble portion in a solvent having an internal pressure above about 3.2 and no greater than about 3.6, the internal pressure being equal to $BV^{-1/3}$ in which B is the surface tension and V is the molecular volume of the solvent, separating the resulting solution from undissolved solid matter and recovering the peptizing agent from the solution.

4. A composition of matter comprising an asphaltic fraction obtained from naturally occurring asphaltic materials and being insoluble in solvents having an internal pressure of not over 3.2 and soluble in solvents having an internal pressure of about 3.6, internal pressure being equal to $BV^{-1/3}$ in which B is the surface tension and V is the molecular volume of the substance, pigments and a vehicle therefor, said composition being substantially free of other asphaltic fractions.

5. A composition of matter comprising an asphaltic fraction obtained from naturally occurring asphaltic materials and being insoluble in pentane and soluble in hexane, pigments including carbon black, and a vehicle selected from the group consisting of natural wax, paraffin wax, mineral oil and mixtures thereof, said composition being substantially free of other asphaltic fractions.

References Cited in the file of this patent

UNITED STATES PATENTS

| 1,868,211 | Wilkelmus le Nobel | July 19, 1932 |
| 2,116,188 | Churchill | May 3, 1938 |
| 2,300,119 | Holmes | Oct. 27, 1942 |
| 2,366,657 | Sorem | Jan. 2, 1945 |

OTHER REFERENCES

"The Properties of Asphaltic Bitumen," Elsevier Pub. Co., Inc., New York, London, Amsterdam, Brussels, J. Ph. Pfeiffer, pg. 27, 39, 45–47.

Abraham: "Asphalts and Allied Substances," vol. 2, 5th ed. (1945), D. Van Nostrand Co., pages 1167, 1168.

"Rheology of Carbon," American Ink Maker, December 1950, pages 34, 39 and 67.